US010589208B2

(12) United States Patent
Mislak

(10) Patent No.: US 10,589,208 B2
(45) Date of Patent: Mar. 17, 2020

(54) HEAT EXCHANGER FILTER ASSEMBLY

(71) Applicant: Johnson Controls Technology Company, Plymouth, MI (US)

(72) Inventor: Nicholas P. Mislak, Bel Air, MD (US)

(73) Assignee: Johnson Controls Technology Company, Auburn Hills, MI (US)

( * ) Notice: Subject to any disclaimer, the term of this patent is extended or adjusted under 35 U.S.C. 154(b) by 271 days.

(21) Appl. No.: 15/611,601

(22) Filed: Jun. 1, 2017

(65) Prior Publication Data
US 2018/0093217 A1  Apr. 5, 2018

Related U.S. Application Data

(60) Provisional application No. 62/404,671, filed on Oct. 5, 2016.

(51) Int. Cl.
B01D 46/44 (2006.01)
B01D 46/00 (2006.01)
B01D 46/18 (2006.01)

(52) U.S. Cl.
CPC ......... B01D 46/446 (2013.01); B01D 46/008 (2013.01); B01D 46/18 (2013.01); B01D 2279/50 (2013.01)

(58) Field of Classification Search
CPC ...... B01D 46/446; B01D 46/16; B01D 46/18; B01D 46/185; B01D 46/008; B01D 46/22; B01D 46/4263; B01D 2279/50
See application file for complete search history.

(56) References Cited

U.S. PATENT DOCUMENTS

| | | | |
|---|---|---|---|
| 2,782,612 A | 2/1957 | Spiegelhalter | |
| 3,332,215 A * | 7/1967 | Revell | B01D 46/18 55/352 |
| 4,221,576 A | 9/1980 | Phillips, Jr. | |
| 5,411,579 A | 5/1995 | Benton et al. | |
| 6,152,998 A | 11/2000 | Taylor | |
| 7,186,290 B2 | 3/2007 | Sheehan et al. | |
| 2005/0150382 A1* | 7/2005 | Sheehan | B01D 46/0028 95/277 |
| 2006/0102006 A1* | 5/2006 | Powell | B01D 46/008 96/429 |
| 2010/0077923 A1 | 4/2010 | Lewis | |

FOREIGN PATENT DOCUMENTS

EP   2071259 A2   6/2009

* cited by examiner

Primary Examiner — Robert Clemente
(74) Attorney, Agent, or Firm — Fletcher Yoder, P.C.

(57) ABSTRACT

A system includes a filter assembly having a filter material disposed in an air flow, a first pressure transducer disposed upstream of the filter material with respect to the air flow, a second pressure transducer disposed downstream of the filter material with respect to the air flow, and a controller coupled to the first pressure transducer and the second pressure transducer, where the controller receives feedback from the first pressure transducer and the second pressure transducer indicative of a pressure differential of the air flow across the filter material, and where the controller is configured to index the filter when the pressure differential of the air flow across the filter material exceeds a threshold.

23 Claims, 7 Drawing Sheets

HEAT EXCHANGER FILTER ASSEMBLY

CROSS-REFERENCE TO RELATED APPLICATIONS

This application is claims priority to and the benefit of U.S. Provisional Application Ser. No. 62/404,671, filed Oct. 5, 2016, entitled "SELF REPLACING EVAPORATOR/CONDENSER FILTER MECHANISM," which is herein incorporated by reference in its entirety for all purposes.

BACKGROUND

The present disclosure relates generally to refrigeration systems. Specifically, the present disclosure relates to a self-replacing filter assembly for a heat exchange unit.

Heating, ventilation, and air conditioning, (HVAC) systems may include filters that are utilized to remove various particles, contaminants, and/or undesirable components from a flow of air through the HVAC system. Typically, filters may be manually replaced periodically as residue, debris, or other particulate matter builds within the filter, thereby enabling air to pass through the filter without substantial obstruction and maintaining efficient operation of the HVAC system. Additionally, timely replacement of the filters may ensure that a sufficient amount of air passes over evaporator coils, such that thermal energy is transferred from the air to a fluid in the evaporator coils to prevent freezing of the fluid in the evaporator coils. Unfortunately, manual replacement of filters within an HVAC system may be time consuming and expensive.

DRAWINGS

BRIEF SUMMARY

Figure 1:
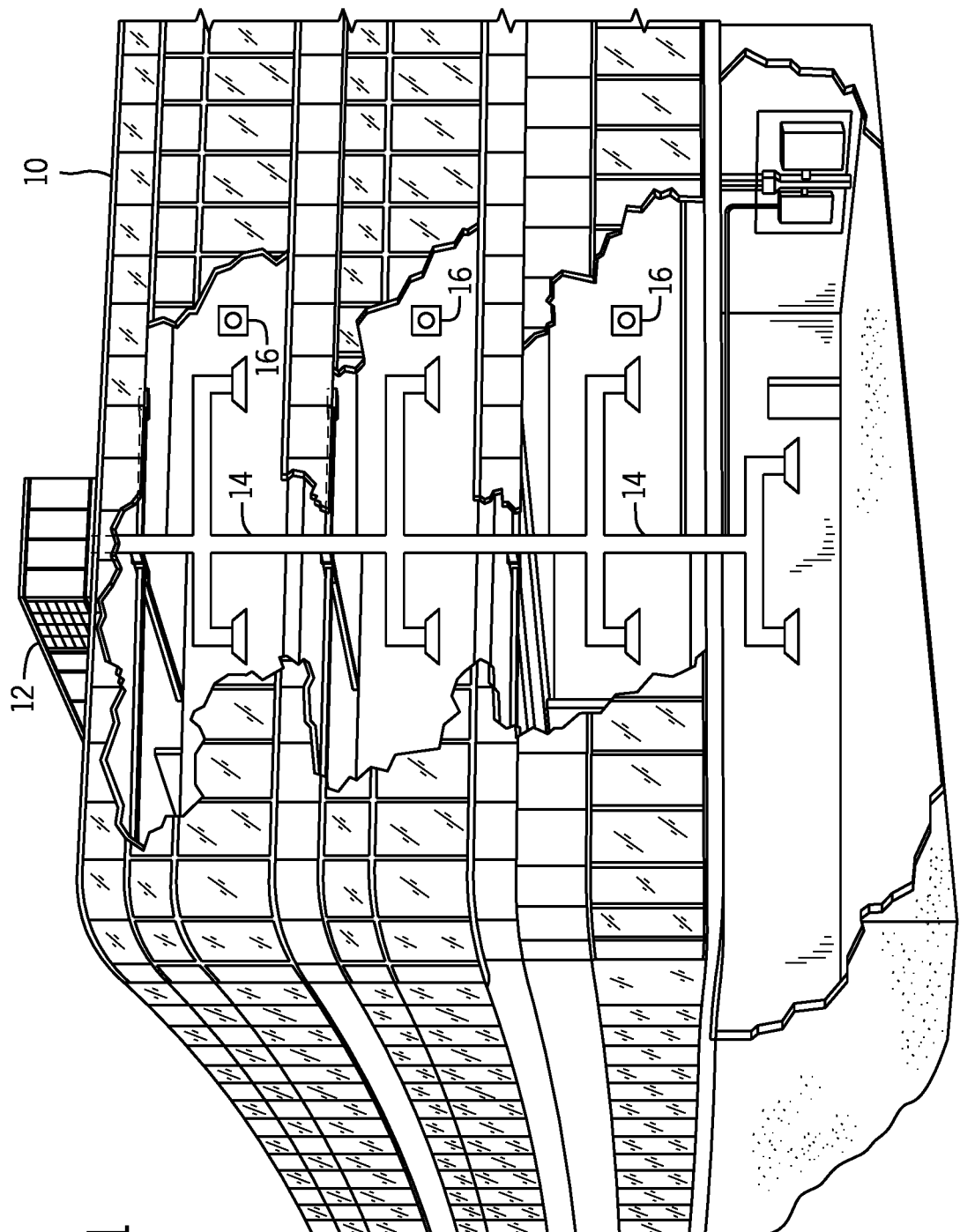
FIG. 1 is a perspective view of an embodiment of a building that may utilize a heating, ventilation, and air conditioning (HVAC) system in a commercial setting, in accordance with an aspect of the present disclosure.

In one embodiment, a filter assembly includes a filter material disposed in an air flow, a first pressure transducer disposed upstream of the filter material with respect to the air flow, a second pressure transducer disposed downstream of the filter material with respect to the air flow, and a controller coupled to the first pressure transducer and the second pressure transducer, where the controller receives feedback from the first pressure transducer and the second pressure transducer indicative of a pressure differential of the air flow across the filter material, and where the controller is configured to index the filter when the pressure differential of the air flow across the filter material exceeds a threshold.

In one embodiment, a heating, ventilation, and air conditioning (HVAC) unit a cabinet having a passageway configured to flow an air flow, a heat exchanger disposed in the cabinet and in a heat exchange relationship with the air flow in the passageway, and a modular filter assembly. The modular filter assembly includes a housing configured to be disposed in the cabinet upstream of the heat exchanger with respect to the air flow, a first member disposed in the housing and having a sheet of filter material, a second member disposed in the housing and coupled to an end of the filter material, such that the filter material extends across a portion of the passageway between the first member and the second member, a drive disposed in the housing and coupled to the second member and configured to rotate the second member, and a controller disposed in the housing and coupled to the drive, where the controller is configured to actuate the drive when a pressure differential of the air flow across the filter material exceeds a threshold, after a predetermined amount of time, or a combination thereof.

In one embodiment, a method for replacing filter material of a modular filter assembly includes receiving feedback indicative of a first pressure of an air flow through a cabinet of a heating, ventilation, and air conditioning (HVAC) unit upstream of a filter material with respect to the air flow, receiving feedback indicative of a second pressure of the air flow through the cabinet of the HVAC unit downstream of the filter material with respect to the air flow, determining a pressure differential of the air flow across the filter material based on the first pressure and the second pressure, comparing the pressure differential to a threshold pressure differential value, and actuating a drive of the modular filter assembly when the pressure differential exceeds the threshold pressure differential value, where the drive is coupled to a first member of a pair of opposing members of the modular filter assembly, and where actuating the drive rotates the first member to replace the filter material with new filter material.

DETAILED DESCRIPTION

As discussed above, manual replacement of filters within an HVAC system may be time consuming and expensive. Therefore, embodiments of the present disclosure are directed to a modular, self-replacing filter assembly that may enhance an operating life of the filter, reduce the frequency of filter replacement, and/or reduce an amount of time to replace the filter. For example, the present disclosure relates to a modular filter assembly that may be disposed within a compartment of an HVAC unit. The modular filter assembly may include opposing members (e.g., opposing rods) disposed in a housing. A first member (e.g., a first rod) of the opposing members may include a roll of filter material and the second member (e.g., second rod) of the opposing members may be coupled to an end of the filter material. When the modular filter assembly is disposed in the HVAC unit, a film of the filter material may be disposed upstream of a heat exchanger (e.g., an evaporator) of the HVAC unit with respect to a fluid flow through the HVAC unit, such that the fluid may be filtered by the filter material. Further, a drive (e.g., an electric motor, a hydraulic motor, a pneumatic motor) may be coupled to the second member of the opposing members and configured to rotate the second member, such that new filter material from the first member may be periodically exposed to the fluid flow (e.g., air flow) and replace used filter material that becomes wound around the second member. In some embodiments, the modular filter assembly may be self-contained, such that a single component (e.g., the housing) may be removed and/or inserted into the HVAC unit when an existing modular filter assembly is to be replaced (e.g., when the filter material of the first member has been transferred to the second rod).

The modular filter assembly of the present disclosure may be replaced less often than traditional filters because the opposing rods may replenish filter material periodically, thereby enhancing an operating life of the modular filter assembly. Furthermore, forming the modular filter assembly as a self-contained unit may facilitate replacement of the modular filter assembly by enabling an operator to remove and install a single component of the HVAC system.

Turning now to the drawings, FIG. 1 illustrates a heating, ventilating, and air conditioning (HVAC) system for building environmental management that may employ one or more HVAC units. In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building 10 with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
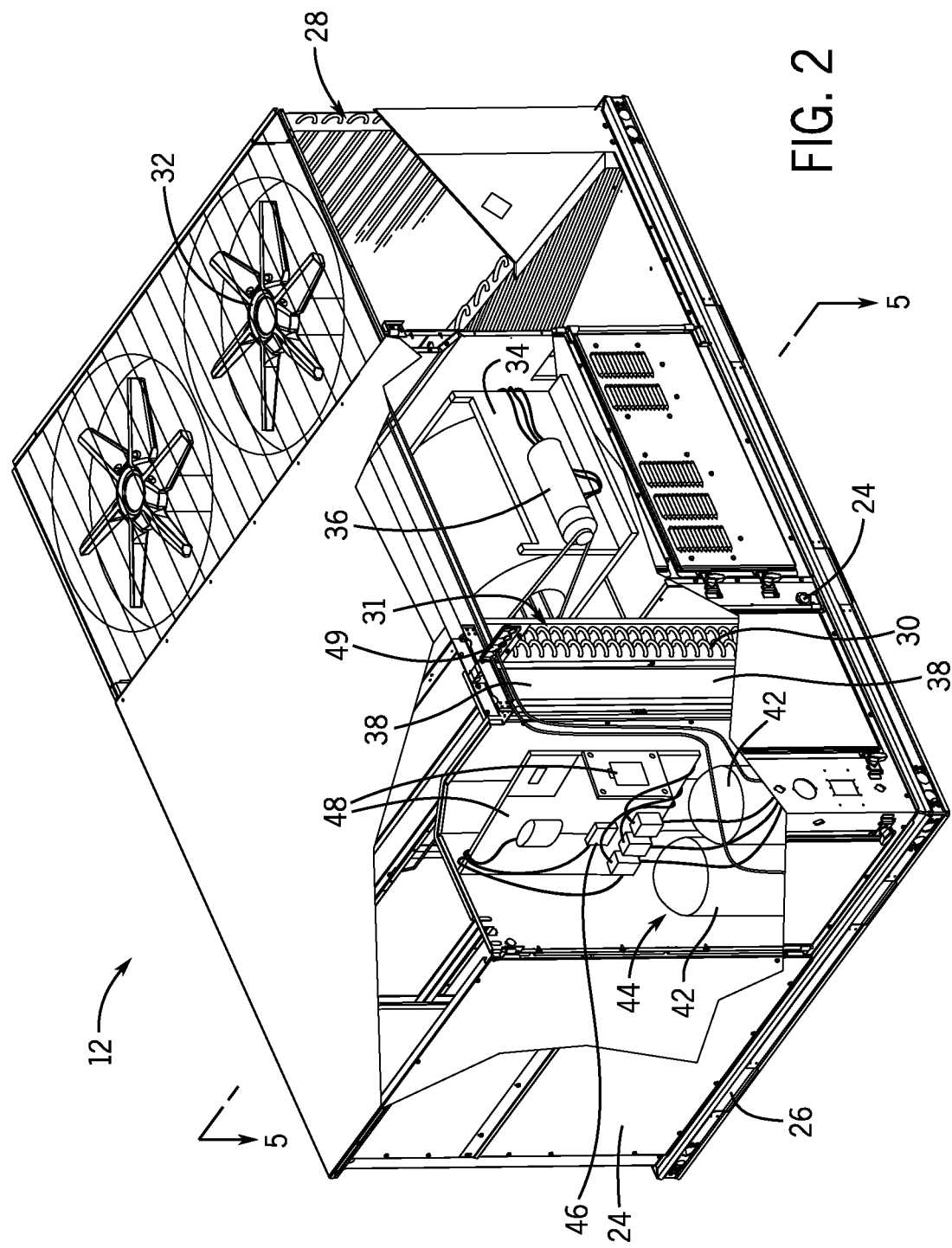
FIG. 2 is a perspective view of an embodiment of an HVAC unit of the HVAC system of FIG. 1, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant (for example, R-410A, steam, or water) through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms (one or more being referred to herein separately or collectively as the control device 16). The control circuitry may be configured to control operation of the equipment, provide alarms, and monitor safety switches. Wiring 49 may connect the control board 48 and the terminal block 46 to the equipment of the HVAC unit 12.

Figure 3:
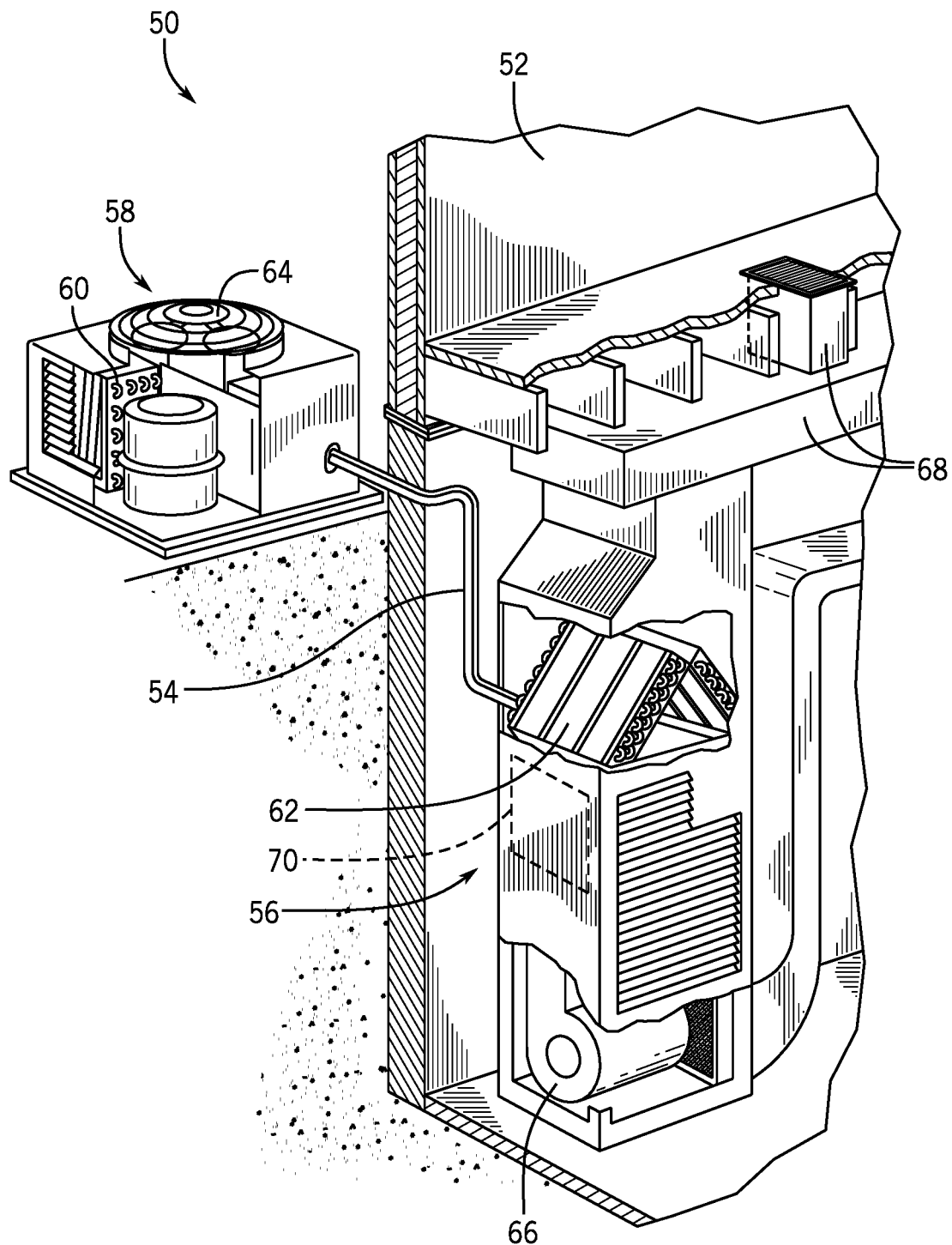
FIG. 3 is a perspective view of an embodiment of a residential, split HVAC system that includes an indoor HVAC unit and an outdoor HVAC unit, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant (which may be expanded by an expansion device, not shown) and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat (plus a small amount), the residential heating and cooling system 50 may become operative to refrigerate additional air for circulation through the residence 52. When the temperature reaches the set point (minus a small amount), the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger (that is, separate from heat exchanger 62), such that air directed by the blower 66 passes over the tubes or pipes and extracts heat from the combustion products. The heated air may then be routed from the furnace system 70 to the ductwork 68 for heating the residence 52.

Figure 4:
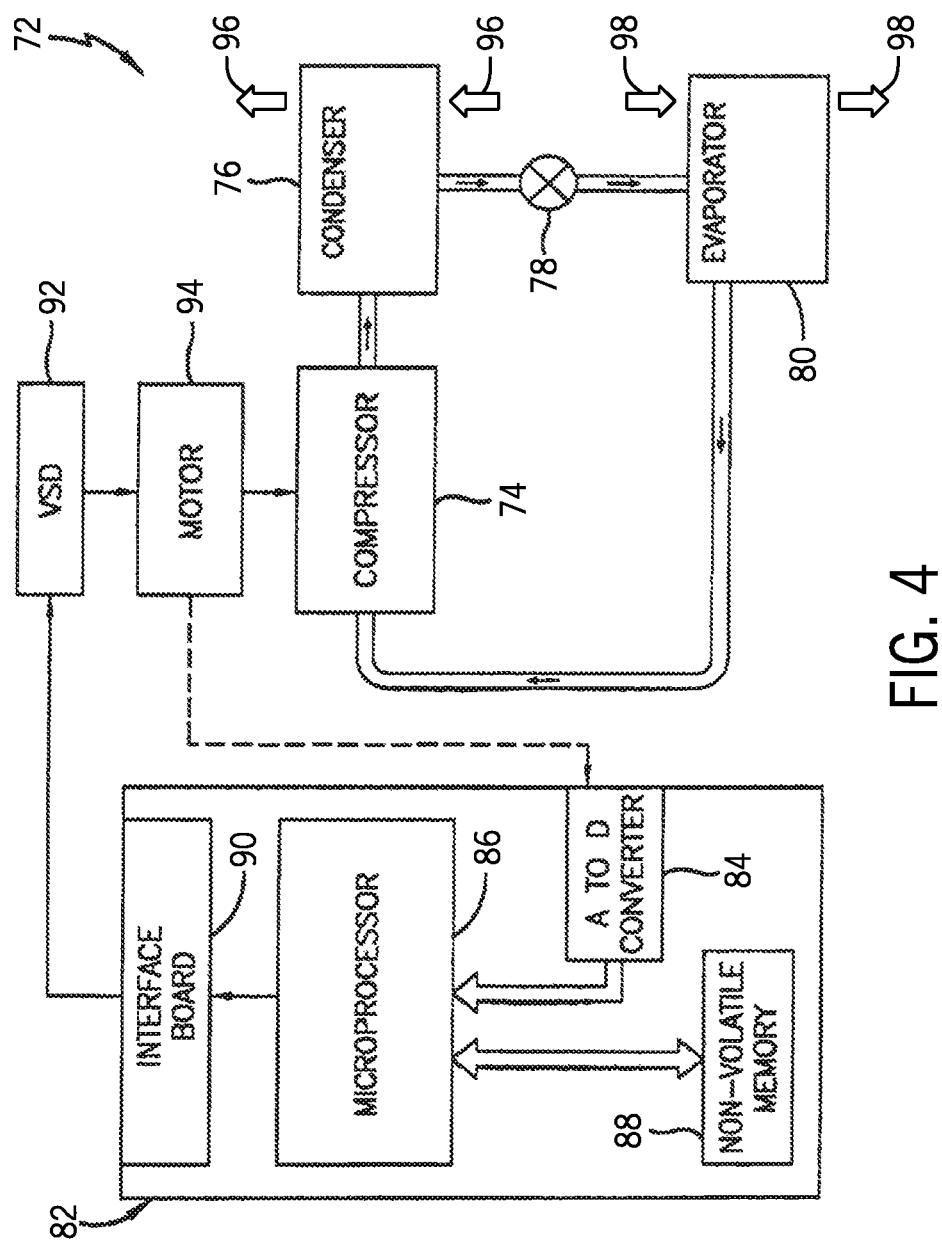
FIG. 4 is a schematic of an embodiment of the HVAC system of FIG. 1, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 38 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

As mentioned above, the filters 38 of the HVAC unit 12 may include a modular filter assembly 100 that is a self-contained component or unit that facilitates replacement of the filters 38 and increases an operating life of the filters 38. The modular filter assembly 100 may include a filter material, such as fiberglass, polyester, electrostatic materials, another fibrous material, or a combination thereof. A size of the modular filter assembly 100 may vary depending on a size and/or capacity of the HVAC unit 12. Additionally, different thicknesses of the filter material may be used to achieve various levels of filtration and energy consumption. For example, a thicker filter material may provide a higher level of filtration, which may ultimately result in lower energy consumption by the blower assembly 34. As discussed above, traditional filters installed within the compartment 31 may be single use filters, which may lead to frequent replacement and increased costs. Embodiments of the present disclosure are directed to the modular filter assembly 100 that may increase an operating life of the filters 38 and facilitate installation of the filters 38 in the HVAC unit 12.

Figure 5:
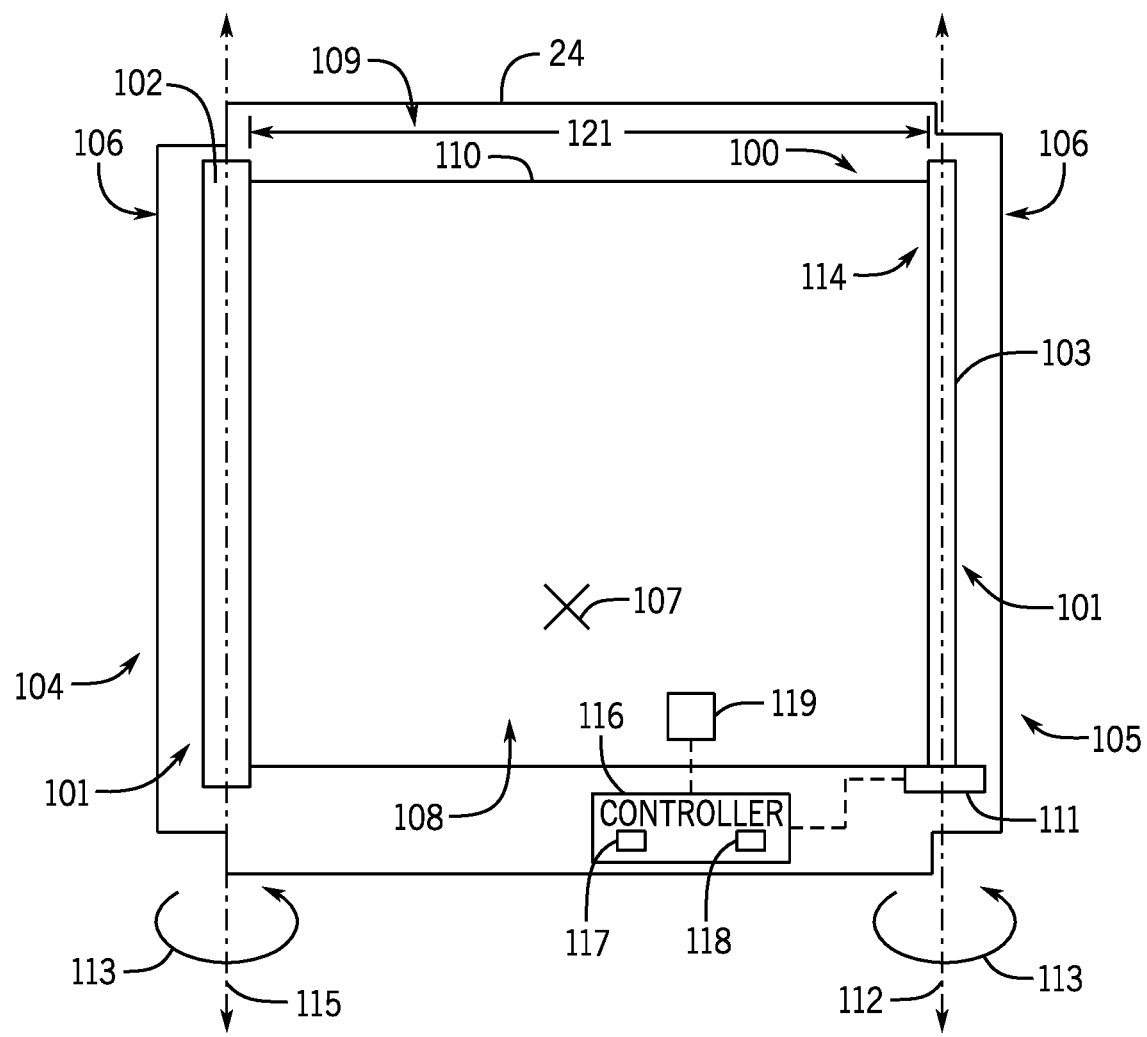
FIG. 5 is a schematic of an embodiment of the HVAC unit of FIG. 2 having a modular filter assembly, in accordance with an aspect of the present disclosure.

For example, FIG. 5 is a sectional schematic of an embodiment of the modular filter assembly 100 disposed in the HVAC unit 12 taken along line 5-5 of FIG. 2. As shown in the illustrated embodiment of FIG. 5, the modular filter assembly 100 may include a pair of opposed members or rods 101 (e.g., a first member or rod 102 and a second member or rod 103). The first rod 102 of the pair of opposed rods 101 may be positioned on a first side 104 of the HVAC unit 12, and the second rod 103 of the pair of opposed rods 101 may be positioned on a second side 105 of the HVAC unit 12, opposite the first side 104.

In some embodiments, the pair of opposed rods 101 may be disposed in protruding portions 106 of the cabinet 24 of the HVAC unit 12. For example, fluid flow (e.g., represented by arrow 107) may be directed through a passageway 108 formed within a body portion 109 of the cabinet 24. In order to fully cover the passageway 108 of the fluid flow with a filter material 110, the protruding portions 106 may be included to receive the pair of opposed rods 101. Disposing the pair of opposed rods 101 into the protruding portions 106 of the cabinet 24 may reduce obstructions to the fluid flow (e.g., air flow) that may be caused by the pair of opposed rods 101 as the fluid flows through the passageway 108. In some embodiments, the protruding portions 106 may be extensions of the body portion 109 of the cabinet 24, such that the protruding portions 106 and the body portion 109 are a single, unitary component. In other embodiments, the protruding portions 106 may be separate components from the body portion 109 and coupled to the body portion 109 via a weld, fasteners, and/or another suitable technique. In still further embodiments, the HVAC unit 12 may not include the protruding portions 106 and the pair of opposed rods 101 may be disposed in the body portion 109.

In any case, the pair of opposed rods 101 may be configured to periodically replace the filter material 110 that is within the passageway 108 upstream of the heat exchanger 30 (not shown). As shown in the illustrated embodiment of FIG. 5, the second rod 103 of the pair of opposed rods 101 may be coupled to a drive 111 (e.g., an electric motor, a hydraulic motor, a pneumatic motor) that is configured to rotate the second rod 103 about an axis 112 in a circumferential direction 113. Rotation of the second rod 103 in the circumferential direction 113 may wind used filter material 110 around the second rod 103 and unwind new filter material 110 from the first rod 102 of the pair of opposed rods 101. For example, when the modular filter assembly 100 is installed in the HVAC unit 12, an end 114 of the filter material 110 may be coupled to the second rod 103 (e.g., via an adhesive, a clamp, a fastener, and/or another suitable technique). Therefore, rotation of the second rod 103 causes the filter material 110 to wrap around the second rod 103 and simultaneously pull filter material 110 from the first rod 102, thereby driving rotation of the first rod 102 about an axis 115 in the circumferential direction 113. Rotation of the second rod 103 (and thus the first rod 102) directs new filter material 110 to extend across the passageway 108 and effectively replaces used filter material 110 that becomes wound around the second rod 103, and thus, not exposed to the fluid flow in the passageway 108. Driving rotation of the second rod 103 with the drive 111 enables new filter material 110 to be disposed in the HVAC unit 12, thereby reducing a frequency with which the modular filter assembly 100 may be replaced.

In some embodiments, rotation of the second rod 103 may occur after the modular filter assembly 100 has been installed in the HVAC unit 12 for a predetermined period of time. For example, the drive 111 of the modular filter assembly 100 may be coupled to the control board 48. In other embodiments, the drive 111 may be coupled to a separate controller 116 of the modular filter assembly 100, which may include memory 117 that stores a series of instructions and a processor 118 configured to execute the instructions. In some embodiments, the control board 48 and/or the controller 116 may be programmed to drive rotation of the second rod 103 (e.g., via the drive 111) after the HVAC unit 12 has operated for a predetermined amount of time after installation and/or after the most recent actuation of the second rod 103. For example, the control board 48 and/or the controller 116 may automatically drive rotation of the second rod 103 after 1 day, after 2 days, after 3 days, after 4 days, after 5 days, after 1 week of operation of the HVAC unit 12, or any other suitable duration of time after the modular filter assembly 100 was installed and/or since the last rotation of the second rod 103.

Additionally or alternatively, rotation of the second rod 103 (e.g., via the drive 111) may occur based on operating parameters of the HVAC unit 12. For example, the modular filter assembly 100 may include a first pressure transducer 119 and a second pressure transducer 120 (see FIG. 6) that may determine an amount of fluid flow through the filter material 110. In some embodiments, the first pressure transducer 119 may be disposed upstream of the filter material 110 with respect to the fluid flow through the HVAC unit 12, as represented by the arrow 107, and the second pressure transducer 120 may be disposed downstream of the filter material 110 with respect to the fluid flow through the HVAC unit 12. Additionally, the first pressure transducer 119 and the second pressure transducer 120 may be electrically coupled to the control board 48 of the HVAC unit 12 and/or the controller 116 of the modular filter assembly 100. Therefore, the first pressure transducer 119 and the second pressure transducer 120 may send feedback to the control board 48 and/or the controller 116 indicative of a pressure differential of fluid upstream of the filter material 110 and fluid downstream of the filter material 110. In certain embodiments, the control board 48 and/or the controller 116 may be configured to actuate the drive 111 to rotate the second rod 103 when the pressure differential of the fluid through the filter material 110 reaches a threshold value (e.g., a target value or a predetermined value). For example, the threshold value may be between 50 kilopascals (kPa) and 2000 kPa, between 75 kPa and 1000 kPa, between 80 and 500 kPa, or between 100 and 200 kPa. In still further embodiments, the control board 48 and/or the controller 116 may be configured to actuate the drive 111 to rotate the second rod 103 after the predetermined amount of time even when the pressure differential does not exceed the threshold value. Thus, the drive 111 may be actuated either when the predetermined period of time passes and/or when the pressure differential exceeds the threshold value.

In some embodiments, the control board 48 and/or the controller 116 may be configured to actuate the drive 111 for a predetermined amount of time to replace a target amount of the filter material 110. For example, the drive 111 may be actuated such that new filter material 110 covers an entire width 121 of the passageway 108. In other words, the drive 111 may rotate the second rod 103 until all of the used filter material 110 previously within the passageway 108 is wound around the second rod 103 and all new filter material 110 previously wound on the first rod 102 is within the passageway 108. In other embodiments, the drive 111 may be actuated such that any suitable amount of the used filter material 110 previously within the passageway 108 is wound around the second rod 103 and replaced with new filter material 110 from the first rod 102.

As discussed above, the filter material 110 of the modular filter assembly 100 may include any suitable material that may collect particles, contaminants, and/or other components from the fluid that may reduce an efficiency of the HVAC unit 12. For example, the filter material 110 may include fiberglass, polyester, electrostatic materials, another fibrous material, or a combination thereof. The filter material 110 may be selected based on a location of the HVAC unit 12, a capacity of the HVAC unit 12, a size of the HVAC unit 12, and/or a position of the modular filter assembly 100 within the HVAC unit 12. In some embodiments, the HVAC unit 12 may include multiple modular filter assemblies 100, such that a first modular filter assembly 100 may include a first filter material 110 configured to collect relatively large particles (e.g., rocks, pebbles, among others) from the fluid and a second modular filter assembly 100, disposed downstream of the first modular filter assembly 100, may include a second filter material 110 configured to collect relatively small particles (e.g., dirt or other contaminants) from the fluid.

Figure 6:
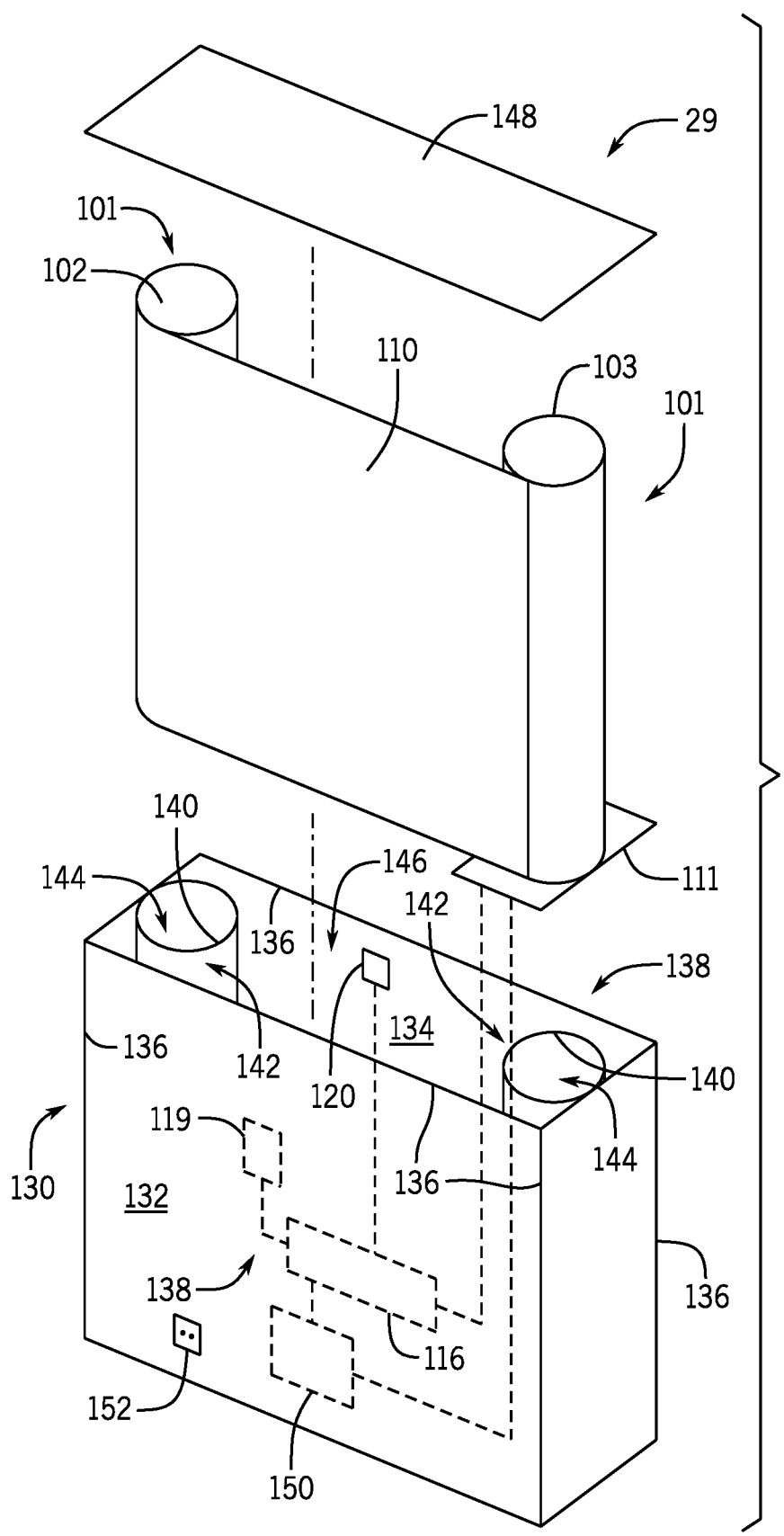
FIG. 6 is an exploded perspective view of an embodiment of the modular filter assembly, in accordance with an aspect of the present disclosure.

As discussed above, the modular filter assembly 100 may be a self-contained unit disposed within a housing 130 to facilitate replacement of the modular filter assembly 100. For example, FIG. 6 is an exploded perspective view of an embodiment of the pair of opposed rods 101, the filter material 110, the drive 111, the controller 116, the first pressure transducer 119, and the second pressure transducer 120, which may be disposed within the housing 130 of the modular filter assembly 100. Accordingly, replacement of the modular filter assembly 100 may include removing an existing modular filter assembly 100 by removing the housing 130 of the existing modular filter assembly 100 and inserting a new modular filter assembly 100 by disposing the housing 130 of the new modular filter assembly 100 into the HVAC unit 12. As such, replacement of the modular filter assembly 100 may be facilitated because a single component (e.g., the housing 130) may be removed and inserted into the HVAC unit 12.

As shown in the illustrated embodiment of FIG. 6, the housing 130 may include a rectangular cross-section. However, in other embodiments, the housing 130 may include any suitable cross-sectional shape. In some embodiments, a first face 132 and a second face 134 of the housing 130 may be configured to enable the fluid flow to pass through the housing 130 and through the filter material 110. For example, in some embodiments, the first face 132 and/or the second face 134 the housing 130 may include a mesh screen that enables the fluid flow to pass through the housing 130, through the filter material 110, and toward the heat exchanger 30. In other embodiments, the first face 132 and the second face 134 may include frame members 136 that form openings 138 in the first face 132 and the second face 134 that enable the fluid flow to pass through the housing 130 and toward the heat exchanger 30. In still further embodiments, the first face 132 and the second face 134 may include any other suitable configuration that directs flow through the filter material 110 and toward the heat exchanger 30.

Additionally, the housing 130 may include guides 140 that facilitate insertion of the first rod 102 and the second rod 103 into the housing 130 and/or substantially maintain a position of the first rod 102 and the second rod 103 with respect to one another in the housing 130. As shown in the illustrated embodiment of FIG. 6, the guides 140 may include a semi-circular cross section 142, such that the first rod 102 and the second rod 103 may be disposed within portions 144 of the housing 130 formed by the guides 140. The semi-circular cross section 142 of the guides 140 may enable the filter material 110 to extend around the guides 140 and into an inner portion 146 of the housing 130. The inner portion 146 of the housing 130 may be the portion through which fluid flow occurs. In other words, the inner portion 146 of the housing 130 may be aligned with the passageway 108 of the cabinet 24. In some embodiments, the portions 144 formed by the guides 140 may be disposed in the protruding portions 106 of the cabinet 24.

As shown in the illustrated embodiment of FIG. 6, the drive 111 may be disposed in the housing 130 between a bottom surface of the housing 130 and the second rod 103. However, in other embodiments, the drive 111 may be disposed in the housing 130 between the second rod 103 and a cover 148 of the housing 130. In still further embodiments, the drive 111 may be disposed in any suitable position in the housing 130 that enables the drive 111 to rotate the second rod 103. Additionally, in some embodiments, the first pressure transducer 119 and the second pressure transducer 120 may be coupled to the housing 130, as shown in FIG. 6. For example, the first pressure transducer 119 and the second pressure transducer 120 may be coupled to the first face 132 and the second face 134, respectively, to the guides 140, and/or to another suitable location within the housing 130 that enables the first pressure transducer 119 and the second pressure transducer 120 to determine a pressure differential of the fluid flow across the filter material 110. The controller 116 may also be disposed in the housing 130. In some embodiments, the controller 116 may be coupled to the housing 130 in a position proximate the first pressure transducer 119, the second pressure transducer 120, and the drive 111. Accordingly, the controller 116 may be electrically coupled to the first pressure transducer 119 and the second pressure transducer 120 to receive feedback from the first pressure transducer 119 and the second pressure transducer 120 indicative of the pressure differential of the fluid flow across the filter material 110. Further, as discussed above, the controller 116 may be coupled to the drive 111 to actuate the drive 111 when the pressure differential exceeds a threshold.

In some embodiments, the controller 116 may be removably coupled to the housing 130, such that the controller 116 may be removed and installed in another modular filter assembly 100 (e.g., a replacement modular filter assembly 100). In some embodiments, the housing 130 may also include a power source 150 (e.g., a battery) that may supply electrical power to the controller 116 and/or the drive 111, such that the controller 116 and/or the drive 111 may not be electrically coupled to the terminal block 46 of the HVAC unit 12. In such embodiments, the modular filter assembly 100 may be completely self-contained, such that the housing 130 may be disposed in the cabinet 24 without coupling the housing 130 and/or the components within the housing 130 to other components of the cabinet 24. However, in other embodiments, the controller 116 and/or the drive 111 may be coupled to the terminal block 46 to receive electrical power from the terminal block 46. In still further embodiments, the controller 116 may not be included in the modular filter assembly 100. Instead, the drive 111, the first pressure transducer 119, and/or the second pressure transducer 120 may be coupled to the control board 48 of the HVAC unit 12. In some embodiments, the modular filter assembly 100 may include a connection interface 152 that may enable the drive 111 and/or the controller 116 to be coupled to the control board 48 and/or the terminal block 46 of the HVAC unit 12. The connection interface 152 may enable the drive 111 and/or the controller 116 to be electrically and communicatively coupled to the control board 48 and/or the terminal block 46, such that drive 111 and/or controller 116 may receive electrical power from the terminal block 46 and/or communicate with the control board 48.

In any case, each of the first rod 102, the second rod 103, the filter material 110, the drive 111, the controller 116, the first pressure transducer 119, and/or the second pressure transducer 120 may be disposed within the housing 130. As such, the housing 130 of the modular filter assembly 100 may be removed from the cabinet 24 without uncoupling and/or disassembling multiple components from the cabinet 24. The modular filter assembly 100 may facilitate replacement (e.g., when substantially all of the filter material 110 of the first rod 102 has moved to the second rod 103) by enabling an operator to remove the housing 130 from the cabinet 24 and install the housing 130 of a replacement modular filter assembly 100. Furthermore, the modular filter assembly 100 may be replaced less frequently than traditional filters because the filter material 110 of the modular filter assembly 100 may be periodically replaced automatically when the control board 48 and/or the controller 116 actuates the drive 111 to rotate the second rod 103.

Figure 7:
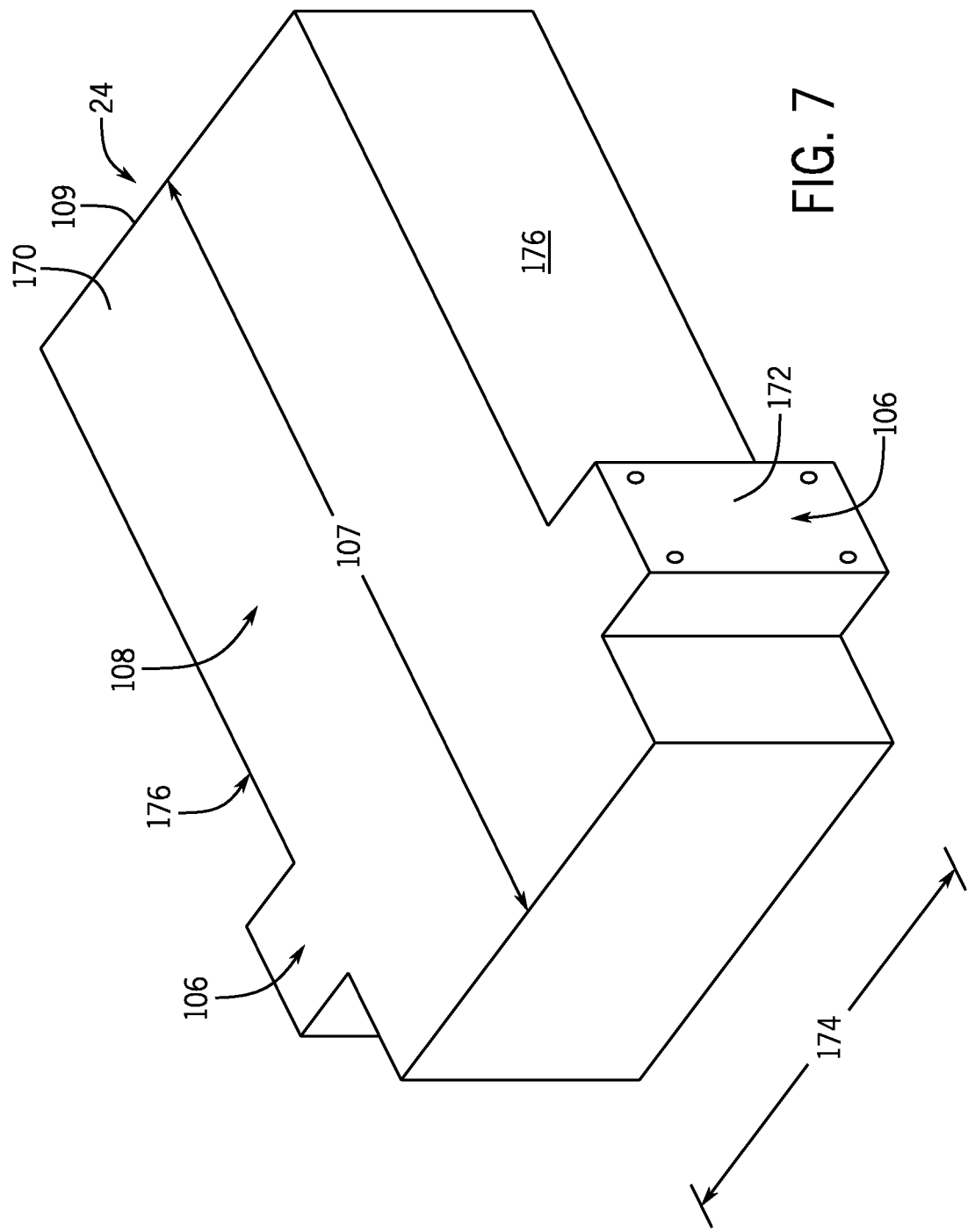
FIG. 7 is a perspective view of an embodiment of a cabinet of the HVAC unit of FIG. 2 that may receive the modular filter assembly of FIG. 5, in accordance with an aspect of the present disclosure.

In some embodiments, the cabinet 24 of the HVAC unit 12 may be modified for the modular filter assembly 100. For example, FIG. 7 is a perspective view of an embodiment of a modified cabinet 24 of the HVAC unit 12 having the protruding portions 106. As discussed above, the protruding portions 106 may receive the first rod 102 and the second rod 103 so that the first rod 102 and the second rod 103 are not disposed in the passageway 108 and obstruct or reduce a surface area of the fluid flow passage through the HVAC unit 12. In some embodiments, the cabinet 24 of the HVAC unit 12 may include a cover 170 that may be removed to perform maintenance on the HVAC unit 12. Additionally, the cover 170 may be removed to replace the modular filter assembly 100. For example, when the cover 170 is removed, the housing 130 of an existing modular filter assembly 100 may be lifted upwards with respect to the cabinet 24 and a replacement modular filter assembly 100 may be positioned above the cabinet and lowered downwards into the cabinet 24 to install the replacement modular filter assembly 100. In other embodiments, the protruding portions 106 may include a removable plate 172, which may be removed to replace the modular filter assembly 100. In such embodiments, the modular filter assembly 100 may be slid across a width 174 of the cabinet 24 to remove and/or insert the modular filter assembly 100 into the cabinet 24.

As shown in the illustrated embodiment of FIG. 7, the protruding portions 106 are rectangular prisms that extend from sides 176 of the cabinet 24. In other embodiments, the protruding portions 106 may be substantially cylindrical extensions from the sides 176. In still further embodiments, the protruding portions 106 may be other suitably shaped prisms that may receive the pair of opposing rods 101. As discussed above, in some embodiments, the protruding portions 106 may be extensions of the body portion 109 of the cabinet 24, such that the protruding portions 106 and the body portion 109 are a single, unitary component. In other embodiments, the protruding portions 106 may be separate components from the body portion 109 and coupled to the body portion 109 via a weld, fasteners, and/or another suitable technique. In such embodiments, the HVAC unit 12 may be retrofitted to include the modular filter assembly 100. In still further embodiments, the HVAC unit 12 may not include the protruding portions 106 and the pair of opposed rods 101 may be disposed in the body portion 109.

While only certain features and embodiments of the present disclosure have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described (i.e., those unrelated to the presently contemplated best mode of carrying out an embodiment, or those unrelated to enabling the claimed embodiments). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A filter assembly comprising:
a filter material disposed in an air flow;
a first pressure transducer disposed upstream of the filter material with respect to the air flow;
a second pressure transducer disposed downstream of the filter material with respect to the air flow; and
a controller coupled to the first pressure transducer and the second pressure transducer, wherein the controller receives feedback from the first pressure transducer and the second pressure transducer indicative of a pressure differential of the air flow across the filter material, and wherein the controller is configured to index the filter material when the pressure differential of the air flow across the filter material exceeds a threshold,
wherein the filter material, the first pressure transducer, the second pressure transducer, and the controller are disposed in a common housing, and wherein the common housing is configured to be disposed within a cabinet of a heating, ventilation, and air conditioning (HVAC) unit.

2. The filter assembly of claim 1, wherein the filter assembly is a self-contained unit.

3. The filter assembly of claim 1, comprising a first member comprising the filter material and a second member coupled to an end of the filter material, such that the filter material extends across a passageway configured to flow the air flow.

4. The filter assembly of claim 3, wherein the first member comprises a first rod having a sheet of the filter material wound around the first rod, and wherein the second member comprises a second rod.

5. The filter assembly of claim 4, comprising a drive configured to rotate the second rod and a power source configured to supply electrical power to the drive, the controller, or both the drive and the controller, wherein rotation of the second rod unwinds the sheet of the filter material from the first rod and winds the sheet of the filter material around the second rod to index the filter material.

6. The filter assembly of claim 3, wherein the first member and the second member are configured to be disposed in protruding portions of the cabinet of the HVAC unit, such that the first member and the second member are not disposed in the passageway.

7. The filter assembly of claim 6, wherein the protruding portions comprise rectangular prisms.

8. The filter assembly of claim 3, wherein the cabinet comprises guides configured to maintain a position of the first member and the second member with respect to one another.

9. The filter assembly of claim 8, wherein each of the guides comprise a semi-circular cross section.

10. The filter assembly of claim 3, wherein the common housing comprises a first face and a second face that facilitate flow of the air flow through the common housing.

11. The filter assembly of claim 10, wherein the first face, the second face, or both comprise a mesh screen.

12. The filter assembly of claim 10, wherein the first face, the second face, or both comprise a frame that forms an opening.

13. The filter assembly of claim 1, wherein the filter material comprises fiberglass, another fibrous material, or a combination thereof.

14. The filter assembly of claim 1, wherein the HVAC unit comprises a rooftop unit.

15. A heating, ventilation, and air conditioning (HVAC) unit, comprising:
a cabinet comprising a passageway configured to flow an air flow;
a heat exchanger disposed in the cabinet and in a heat exchange relationship with the air flow in the passageway; and
a modular filter assembly configured to be disposed in the cabinet, comprising:
a housing configured to be disposed in the cabinet upstream of the heat exchanger with respect to the air flow;
a first member disposed in the housing and comprising a sheet of filter material;
a second member disposed in the housing and coupled to an end of the filter material, such that the filter material extends across a portion of the passageway between the first member and the second member;
a drive disposed in the housing and coupled to the second member and configured to rotate the second member; and
a controller disposed in the housing and coupled to the drive, wherein the controller is configured to actuate the drive when a pressure differential of the air flow across the filter material exceeds a threshold, after a predetermined amount of time, or a combination thereof.

16. The HVAC unit of claim 15, wherein the modular filter assembly is self-contained.

17. The HVAC unit of claim 15, wherein the modular filter assembly comprises a first pressure transducer disposed upstream of the filter material with respect to the air flow and a second pressure transducer disposed downstream of the filter material with respect to the air flow, and wherein the first pressure transducer and the second pressure transducer are disposed within the housing and communicatively coupled to the controller.

18. The HVAC unit of claim 17, wherein the controller is configured to actuate the drive when the pressure differential of the air flow across the material exceeds the threshold, and wherein the pressure differential of the air flow across the material is determined by the first pressure transducer and the second pressure transducer.

19. The HVAC unit of claim 15, wherein the controller is configured to actuate the drive after the predetermined amount of time, and wherein the predetermined amount of time is measured from installation of the modular filter assembly, from a most recent actuation event of the drive, or a combination thereof.

20. A method for replacing filter material of a modular filter assembly, comprising:
    receiving feedback indicative of a first pressure of an air flow through a cabinet of a heating, ventilation, and air conditioning (HVAC) unit upstream of a filter material with respect to the air flow;
    receiving feedback indicative of a second pressure of the air flow through the cabinet of the HVAC unit downstream of the filter material with respect to the air flow;
    determining a pressure differential of the air flow across the filter material based on the first pressure and the second pressure;
    comparing the pressure differential to a threshold pressure differential value; and
    actuating a drive of the modular filter assembly when the pressure differential exceeds the threshold pressure differential value, wherein the drive is coupled to a first member of a pair of opposing members of the modular filter assembly, and wherein actuating the drive rotates the first member to replace the filter material with new filter material,
    wherein the filter material, the pair of opposing members, and the drive are disposed in a common housing of the modular filter assembly, and wherein the common housing is configured to be disposed within the cabinet of the HVAC unit.

21. The method of claim 20, comprising installing the modular filter assembly into the HVAC unit, wherein installing the modular filter assembly comprises sliding the common housing of the modular filter assembly into an opening of the cabinet of the HVAC unit.

22. The method of claim 20, comprising actuating the drive of the modular filter assembly after a predetermined amount of time from installation of the modular filter assembly, from a most recent actuation event of the drive, or a combination thereof.

23. The method of claim 22, wherein the predetermined amount of time is 1 week from installation of the modular filter assembly, from a most recent actuation event of the drive, or a combination thereof.

* * * * *